3,639,577
INJECTABLE ADJUVANT, METHOD OF PREPARING SAME AND COMPOSITIONS INCLUDING SUCH ADJUVANT
John T. Urton, Prairie Village, and Max E. Glass, Kansas City, Kans., and Stephen F. Donahue, Kansas City, and Arthur Carlson, Jr., Overland Park, Mo., assignors to Haver-Lockhart Laboratories Incorporated, St. Shawnee, Kans.
Filed Feb. 23, 1968, Ser. No. 707,671
Int. Cl. A61k 23/00, 27/12
U.S. Cl. 424—88
2 Claims

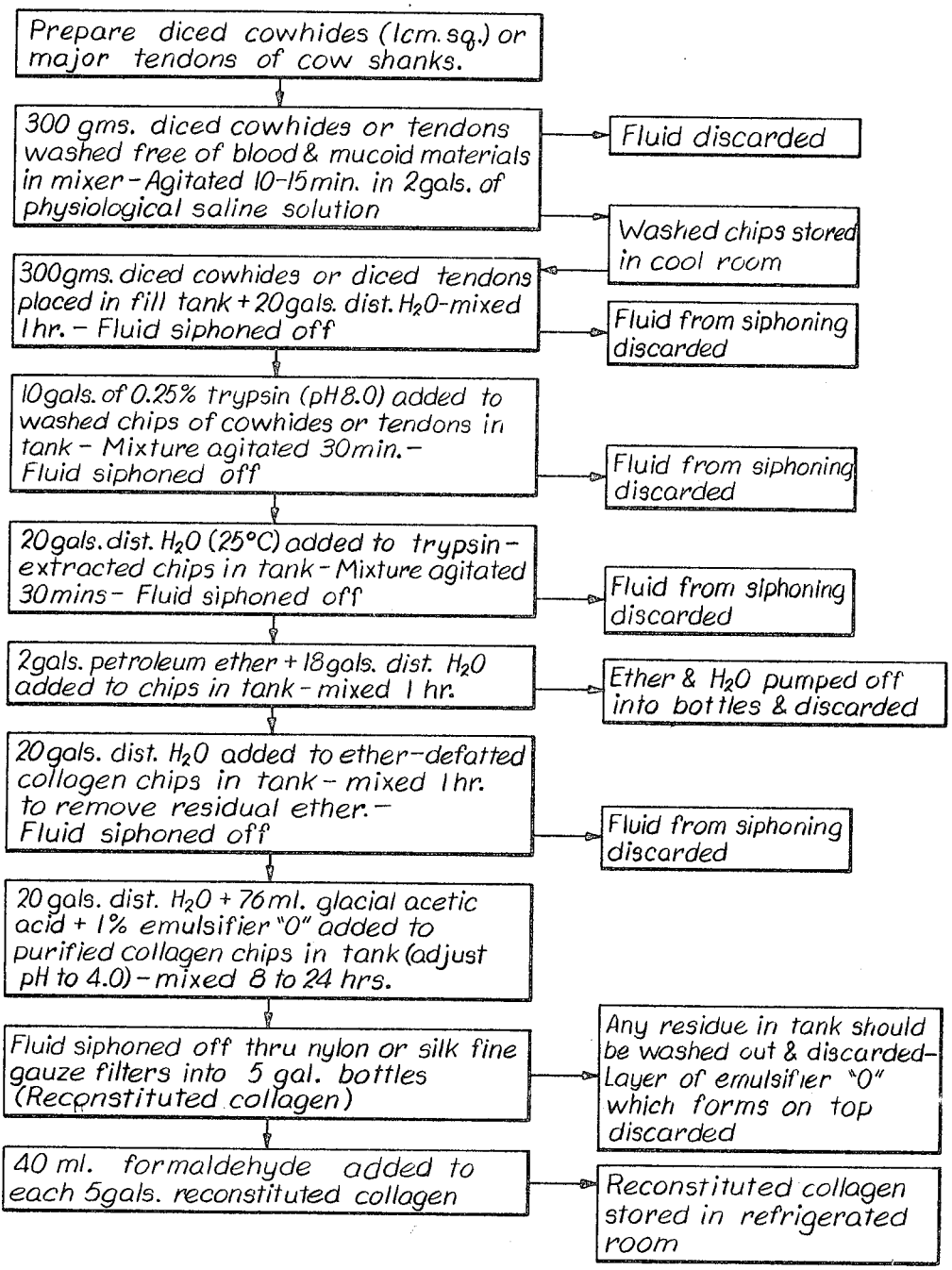

ABSTRACT OF THE DISCLOSURE

An injectable medicinal composition comprising a liquid substance containing a pharmaceutical agent combined with a novel adjuvant therefor capable of enhancing the effect of the agent. The pharmaceutical agent is of the type having nitrogen atoms and the adjuvant in its preferred form includes a macromolecular synthetic resin complexing material such as an acrylic acid polymer across-linked with a polysaccharide, an ingredient having amine groups, e.g. reconstituted collagen, and an emulsifier including polyoxyethylene sorbitan monooleate, sorbitan monolaurate, and cottonseed oil in water. The adjuvant is useful with various medicinal agents including antigens, hormones, allergens and serums of the type which will complex with the synthetic resin material.

This invention relates to an adjuvant system for injectable medicinal compositions and is directed to the preparation and provision of an adjuvant which will increase the residual effectiveness of various types of medicinal agents without producing toxic or undesirable side effects such as lesions or indurations. The adjuvant is especially useful with medicinal agents such as antigens, serums and other chemotherapeutic materials which contain N atoms.

The adjuvant has the unique property of undergoing relatively slow but substantially complete dissociation in the host's tissues and at the same time causing the medicinal agent incorporated therewith to be released to the host substantially at the rate of dissociation and absorption of the adjuvant. Although the manner in which the adjuvant functions in vivo is not fully understood, it is believed that the adjuvant gives both a depot and a routing effect in combination. By virtue of the depot action, the rate at which the medicament is released is controlled and because of the routing effect, the agent is directed toward those areas of the host most favorable to its utilization.

It has long been known that the effectivness of some injectable medicinal agents, and particularly materials such as immunogens, may be significantly increased when the agent is combined with an adjuvant which is capable of retarding the rate of release of active agent to the host's system. In this way an effect is obtained which is comparable to the administration of many small doses injected periodically at regular intervals. Thus, the term "adjuvant" in this context is used to designate a substance that operates as a binder, carrier or suspending vehicle for immunogens and other medicinal agents alone or in combination, the function of which is to retard dispersion and absorption of such immunogens or medicinal agents into the host's system while at the same time routing the agents to those areas where they are the most efficiently utilized whereby greater prophylactic or therapeutic activity is attained.

In the selection of such an adjuvant many factors must be taken into consideration to insure a retarded rate of release in the most efficient manner with minimum toxic, allergenic, and antigenic effects imposed on the host. Thus, the adjuvant should not only be capable of slow dispersion and absorption in the host but should also be able to bind the immunogen or medicinal agent and release the active material to the host over an extended period as the adjuvant composition itself is absorbed and dissociated by the host's system. As used herein, the term "medicinal agent" is employed in a broad sense and encompasses agents which are useful in the prevention, cure or alleviation of disease or the prevention of some physiological condition or occurrence such as pregnancy. As will be explained, the adjuvant system is most useful with medicinal agents of the type which contain N atoms.

A number of carriers for the general purposes outlined have been proposed in the past, and have included, e.g., metallic oxides (i.e. aluminum hydroxide), alum, inorganic chelates of salts, gelatins, various paraffin-type oils, synthesized resins, alginates, mucoid and polysaccharide compounds, caseinates, and blood-derived substances such as fibrin clots. None of these materials have been found entirely satisfactory because in certain instances they have adverse effects on the host and in other cases have undesirable pharmaceutical properties.

Alum, the metallic oxides and chelates of salts have been associated with the production of sterile abscesses. Other researchers have claimed that it is doubtful if such chemicals are ever completely removed from the body through the host's natural processes, thus leaving an inorganic debris as a residuum. Moreover, while these salts and oxides appear to be low in toxicity, there exists the possibility that they may be phagocytized by the cells of the reticuloendothelial system (littoral cells and sinusoidal cells of the liver and spleen) as part of the insoluble debris. There is evidence that such debris may be physically harmful to the various filter mechanisms of the body, e.g., the liver, spleen and kidneys.

The synthesized oils and petroleum derivatives may be particularly undesirable, in spite of relatively slow dispersion thereof in the body, inasmuch as they frequently are broken down into aromatic hydrocarbons, which may, in fact, be carcinogenic. Furthermore, these substances have been found to be capable of producing sterile abscesses and also may never be completely eliminated by the body.

With respect to fully denatured animal-derived substances, such as gelatin, the primary objection thereto is not the deleterious effect of the substance on its host, but rather that dispersion of the gelatin from the site of injection throughout the body of the host may be too rapid to qualify as an efficient absorption retarding vehicle; hence a poor adjuvant. Thus, whenever gelatin is used as a carrier, the gelatin is usually pretreated with tanning agents or other inorganic compounds to retard rapid dispersion of the material throughout the body. These supplements may prove deleterious. The fate of such materials in the body of the host is not completely understood but the possibility exists that the formation of insoluble debris can result. Finally, with substances such as gelatin, which have a tendency to swell when introduced parenterally, under in vivo conditions, unpleasant mechanical side effects including discomfort and swelling may be produced.

Because blood-derived fibrin substances have been found to elicit immune responses in the body of the host, use of such substances as adjuvants is undesirable because of immunogenic dangers. It is common knowledge that certain similarities exist in the fibrins, fibrinogens and thrombins derived from various species of animals thereby increasing the likelihood of immune or allergenic response when such materials are used. Although a few of the above described vehicles have been previously used or suggested as adjuvants, in part of at least because of their attributes of relatively slow dispersion from the site of injection, they possess characteristics which make for poor control of their rate of intra-host dispersion.

It is, therefore, the primary object of this invention to provide an injectable medicinal composition including an adjuvant which is operable to significantly increase the residual effectiveness of the medicinal agent in the composition without producing deleterious toxic, allergenic or antigenic responses.

Another important object of the invention is to provide an improved injectable adjuvant for medicinal agents which does not have the attendant detrimental effects associated with previously known adjuvants and exhibits sufficient depot action to retard release of the active ingredient while at the same time performing a routing function to direct the released medicament to sites in the host's body where most effective use of the agent can take place.

A still further important object of the invention is to provide an injectable liquid substance having a medicinal agent therein of the type having N atoms and combined with an adjuvant therefor which is capable of increasing the residual effectiveness of the agent at least in part by virtue of the fact that the adjuvant includes a slowly utilizable macromolecular synthetic resin material capable of forming a complex with the medicinal agent at the N atoms thereon to tightly hold the agent and thereby only slowly release such agent in vivo substantially at the rate of dispersion and absorption of the complexing material.

Also an important object of the invention is to provide an adjuvant wherein is included an emulsifier for the synthetic resin complexing material which is not only capable of assuring complete dispersion of the material in the liquid portion of the injectable substance, but also serves a routing function to direct the released medicament to the most favorable sites for utilization thereof while at the same time being completely dispersible in and dissociatable by the host's system.

It is also an important object of the invention to provide an adjuvant including a synthetic resin complexing material as described wherein is included an ingredient having amine groups reactable iwth remaining free hydroxyl and carboxyl groups on the complexing material to thus limit the ability of the material to bond to the host's tissues and thereby preclude the formation of lesions and indurations at the area of injection.

Also an object of the invention is to provide an improved adjuvant especially useful in connection with protein and mucopolysaccharide immunogens by virtue of the utilization in the adjuvant formulation of a polymer of acrylic acid cross-linked with polyallyl sucrose and which is capable of complexing with the amine groups of immunogen to cause the latter to be released to the host upon injection of the composition substantially at the rate of dispersion and dissociation of the resin material.

Also an object of the invention is to provide an injectable medicinal composition wherein the concentration of the medicinal agent in the formulation may be varied as desired without requiring significant changes in the adjuvant to accommodate different active agent concentrations.

A very important object of the invention is to provide an improved adjuvant for injectable medicinal compositions which not only controls the rate of release of the active agent at the site of injection but also functions to provide the effect of mobile depots of the medicinal agent or depots at sites other than the injection site, e.g., the cells of the lymphocyte series in the host's system. In addition, it is an object to provide an adjuvant as described wherein depot action is provided at the injection site by the viscosity of the adjuvant formulation. Thus, with an immunogen, the improved adjuvant makes possible a potentiated antibody response of the host's body to a single injection of an antigen.

Another important object of the invention is to provide an injectable immunological composition wherein the shelf stability and protection against high and low temperature extremes are increased by virtue of the utilization of a cross-linked acrylic acid-polysaccharide polymer capable of forming a complex with the antigenic agent. An incident of such complex formation is protection of the immunogen against deterioration caused by unfavorable pH conditions and free radicals.

Since the adjuvant of the present invention is especially useful in connection with immunogens such as vaccines, injectable formulations of this type will be described first. However, as will be made clear, other medicinal agents may be incorporated with the novel adjuvant composition and superior potentiated results obtained. However, for best performance, the medicinal agent should be of the type having N atoms available for bonding to certain constituents of the adjuvant. Exemplary of these materials are hormones, allergens, antigens, serums and chemotherapeutics.

The adjuvant (designated in the examples as adjuvant "HL") is made of three major systems. It includes: (a) a macromolecular synthetic resin and complexing material having free carboxyl and hydroxyl sites capable of bonding with the medicinal agent at the N atoms thereon to hold the agent to the resin; (b) an emulsifier (herein for convenience referred to as emulsifier O) for the synthetic resin complexing material and capable of assuring relatively complete dispersion of the resin in the liquid portion of a final complete injectable composition; and (c) an ingredient having amine groups which are capable of combining with the free carboxyl and hydroxyl groups which remain after combination of the resin with the medicinal agent to thereby limit the ability of the resin to bond to the host's tissues.

In its preferred form, adjuvant "HL" is made up of the combination of: (a) Carbopol 934P, B. F. Goodrich Chemical Co., defined in the literature as a polymer of acrylic acid cross-linked with polyallyl sucrose; (b) emulsifier O consisting of polyoxyethylene sorbitan monoleate, sorbitan monolaurate and cottonseed oil in water; and (c) reconstituted collagen. Admixture of the constituents under ambient conditions is the only procedure necessary to prepare the material.

Carbopol 934P is described in detail in U.S. Patent No. 2,909,462 and although the polymer containing polyallyl sucrose is preferred, satisfactory results can also be obtained by using acrylic acid polymers cross-linked with other equivalent polysaccharides. The letter P in Carbopol 934P is used to designate the pharmaceutical grade of the product.

In certain formulations, Carbopol 941 has been found to give somewhat better results and has a better overall appearance because it is somewhat more saturated than Carbopol 934P. However, it is necessary to more carefully load the free hydroxyl and carboxyl sites of the material with an amine compound than is the case with Carbopol 934P to prevent irritation of the host's tissue at the injection site.

Emulsifier O preferably contains:

2.5 ml. polyoxyethylene sorbitan monooleate (Polysorbate 80, Atlas Powder Co.)
2.5 ml. sorbitan monolaurate (Span 20, Atlas Powder Co.)
50 ml. cottonseed oil
100 ml. q.s. distilled water
(HLB factor approximately 12)

Variation of the proportions of the emulsifier is permissible within limits. However, the HLB factor preferably should be maintained within the range of about 11.2 to approximately 12.

The preferred ranges of the constituents of adjuvant "HL" are:

1 ml. emulsifier O
0.1–0.3 gm. Carbopol 934P
25–50 ml. reconstituted collagen (containing 0.375–0.75 gm. of collagen)
100 ml. q.s. distilled water Best results have been obtained using the following proportions of constituents in adjuvant "HL":

1 ml. emulsifier O
0.2 gm. Carbopol 934P
20 ml. reconstituted collagen (containing 0.3 gm. of collagen)
100 ml. q.s. distilled water This is the formulation used in Examples 1 to 5 set forth hereinafter.

The amount of adjuvant "HL" combined with the medicinal agent varies with the particular product and whether or not a suspension is desired. Generally, the final injectable composition will contain from 10% to 75% by weight of adjuvant "HL" of the preferred relative proportions. Sufficient adjuvant should be added to cause a substantially homogenous suspension to be formed which is not so viscous that it will not readily flow through standard size hollow needles.

Typically virus products are provided with about 10% by weight of adjuvant "HL" of the type which contains 0.15% weight-to-volume of Carbopol 934P in the final composition. Bacterins usually are provided with from 50% to 75% of an adjuvant formulation containing about 0.2% of Carbopol 934P on a weight-to-volume basis. Best results are obtained when the range of Carbopol 934P in the final injectable product is maintained within the range of 0.01% to 0.5% weight-to-volume.

Carbopol 934P is thought to have the property of forming chemical or physical bonds with protein and mucopolysaccharide antigens, as well as other compositions containing N atoms, holding them in a moderately viscous menstruum which slowly releases certain bound components under in vivo physiological conditions. It is theorized that because of the high van der Waal cohesive forces and hydrogen bonding tendencies exhibited by Carbopol 934P toward most proteins, it forms loose hydrogen bonds as well as carboxyl bonds with compounds containing N atoms available for bond sites. Thus, for example, in the case of immunogenic compositions, the Carbopol 934P provides a more stable antigenic complex which serves to decrease the rate of metabolic degradation of the antigenic complex by enzymes (lyotropic and proteolytic enzymes) by the leucocytes at the site of inoculation (e.g., polymorphonuclear neutrophils). Immunological competent cells are then attracted to the site of the injection so that they can form antibodies in response to the antigenic stimulation.

It is believed that the Carbopol 934P antigenic complex is more accessible to lymphocytes and is more difficult for the enzymes released by neutrophils to destroy. One of the biggest problems in immunology and essentially one of the basic functions of an adjuvant is to protect the antigen composition from rapid neutrophil deterioration. The large molecules formed by the resin-antigen combination thus serve to protect the antigenic material from enzymatic deterioration.

Normally, only small amounts of Carbopol 934P in powder form may be brought into aqueous suspension at pH's on the alkaline side of neutrality. The viscosity increases manyfold when a pH of 8 is reached; but by using an emulsifier in the system it is possible to increase the concentration and aqueous stability of the adjuvant containing Carbopol 934P without causing gelation at pH levels of 7 to 8. An increase in the pH of Carbopol 934P in aqueous suspension to pH's in the range of 7 to 8 not only causes the viscosity to increase but also probably results in the resin forming loose bonds with water. This holds the Carbopol 934P in suspension and increases the electrostatic tension of the colloidal suspension to the point where its viscosity substantially increases. Additions of proteins or organic molecules to Carbopol 934P during this time causes the viscosity to drop. It is likely that organic molecules such as proteins and amines have a higher binding coefficient to the free bonding sites of the resin than does water. Water is, therefore, pushed out and the viscosity of the total menstruum is lowered.

Use of an emulsifier makes it possible to dissolve more Carbopol 934P in aqueous solution without gelation than is the case when such emulsifier is omitted. This apparently causes a lower water binding tendency and it is possible therefore to increase the protein or amine load substantially above that of solutions just containing Carbopol 934P alone. Carbopol 934P has some emulsion stabilizing properties. Thus, the hydrophile-lipophile balance does not appear to be as critical when Carbopol 934P is used.

An amine dye such as phenylenediamine may be used to trace the dispersion route of adjuvant "HL" in a host. In one such test, a small quantity of this dye (1 mg./1,000 ml.) was added to the adjuvant composition prior to the addition of reconstituted collagen. The dye, because of its amine sites, bonded tightly to the Carbopol 934P resin, allowing the total adjuvant "HL" menstrum to be traced after injection into the body. All injections were made subcutaneously and ten animals (mice) were used in the experiment. The phenylenediamine was slowly removed from the subcutaneous injection site in each animal as the days passed. By the seventh day following inoculation, less than one-third of the material could be found at the site of injection. The kidneys, liver and spleen of one of the test animals were removed and no dye was detected in these organs. By the fourteenth day, no dye that could be visually observed was present in any of the animals. This experiment shows that an amine dye having approximately the same bond potential for Carbopol 934P as proteinaceous antigens, is held by the synthetic resin and slowly released from the Carbopol 934P bond. The mechanism of this release is not fully understood but probably is attributable not only to a raise in pH (alkalinity of the tissues) and uncoupling by enzyme action, but also degradation by the tissues of the body to cause the bound dye to be slowly given up to the animal's system.

It has previously been suggested that Carbopol 934P has some stabilizing effect on proteins and it has now been found that it also stabilizes antigens. For example, it has been established that there was no loss in antigenic potency of a vaccine having a quantity of adjuvant "HL" therein when the product was stored at 37° C. for one month. This result is to be contrasted with the fact that antigens without protection deteriorate logarithmically under high temperature conditions. The ability of Carbopol 934P to stabilize antigens is believed to occur in at least the following ways: (1) protection against kinetic energy (heat); (2) protection from free radicals; (3) protection from deterioration caused by water of crystallization of freezing; and (4) Carbopol 934P is believed to preclude or minimize antigenic deterioration due to oxidation and reduction.

Carbopol 934P has the property of protecting aqueous solutions from free radical deterioration because of the way in which most free radicals are picked up by the resin itself thereby preserving and protecting other labile substances present in the menstrum. In most aqueous and saline solutions, normal room conditions cause micromolecular collisions of molecules which produce aging because of kinetic deterioration. When Carbopol 934P is added to a composition not only does the kinetic energy decrease in the system, but the substances which become bound to the resin are thereby protected by the large molecule attached thereto. In the case of antigens and other substances, the fact that Carbopol 934P assists in the formation of a stabile emulsion also serves to insure that the injectable product is in a truly homogenous state and thus approximately equal amounts of the actual materials are distributed throughout each milliliter of the aqueous suspension. Insofar as protection against freezing is concerned, it has been determined that vaccines containing adjuvant "HL" do not freeze at temperatures as low as −30° C. It is generally throught that Carbopol 934P will freeze at about −10° F. but even so it does not actually freeze because in this particular case water is bound to the molecules of the resin. It is known that bound water has difficulty in forming crystals and the actual crystal formation is necessary prior to what is designated mechanical freezing. In the present system most of the water is tied up with the resin and mechanical freezing, which is the major deteriorative force at low temperatures on antigens, is avoided. Carbopol 934P also serves to stabilize the emulsion state of the adjuvant, and helps suspend any unbound antigen in the menstrum when used in the proper amounts, thus making an homogeneous preparation. In addition, Carbopol 934P has the property of holding the antigen in the tissues longer than would normally be the case, thus creating a depot effect. This in itself provides an adjuvant effect attributable to a potentiated reaction similar to that induced by small repeated doses of vaccine administered over a span of time.

Since Carbopol 934P also increases the viscosity of the injected vaccine, this in itself serves to slow the absorption rate of the antigen from the injection site, thereby producing an adjuvant effect by virtue of the fact that access of body fluids to the bound and unbound antigens contained within the innoculant is restricted. As an injection menstrum, Carbopol 934P provides high viscosity and adhesive characteristics with less irritation, providing it is properly loaded with antigens or other amine compounds than is the case with common parenterally injectable compositions, such as normal saline and distilled water.

The combination of an emulsifier with Carbopol 934P makes it possible to dissolve larger amounts of the resin in the menstrum than would otherwise be the case, thereby making the total process of producing the adjuvant easier and faster. The increased amount of resin made soluble by use of the emulsifier makes it possible to load more antigen into the preparation and also to increase the viscosity to levels that allow more thorough suspension of any surplus (unbound) antigen, as well as the necessary electrostatic tension to provide a good holding agent in the tissues. Emulsifier O as formulated herein has a sensitive hydrophile-lipophile balance (HLB) of 12 determined in accordance with the standard of the Atlas HLB Computing Graph of Atlas Powder Company. This balance provides the necessary emulsion stability with a high level of homogenity for large polymer molecules such as Carbopol 934P and reconstituted collagen.

Incorporation of emulsifier O into the composition makes an emulsion of the adjuvant vaccine, and because of this emulsified state it appears to be routed to the lymphatic system where it may contact the lymphoid series cells (in lymph glands), which can absorb the antigen by pinocytosis. Since the locus of the immune reaction resides chiefly in the cells of the lymphocyte series, such a routing is highly desirable. Other adjuvants reside at the site of injection until phagocytized by neutrophils. These neutrophils destroy part of the antigen by enzymic degradation, and the rest finally finds its way to the lymphatic system. The present system results in a more efficient utilization of the antigen. This emulsifier combination disclosed consists of nonionic emulsifiers. Because of this, as well as because of the small quantity of these nonionic detergents utilized in the total menstrum, there is very little, if any, tissue damage due to ion imbalance in the tissue. Also, very little oil is used in the adjuvant and this also minimizes any sterile abscesses that might be produced. In addition, the recommended oil is cottonseed oil which is relatively readily metabolized by the host. Thus, Carbopol 934P and the amine-containing compound (e.g., collagen or antigen) which forms a depot effect, represent one phase of the adjuvant "HL." Another phase is represented by the emulsified nature of the adjuvant which routes the antigen, when released, to the lymphatic immune system. The result is a two-phased adjuvant: (1) depot; and (2) dispersion to the lymphatic system. Also, as previously indicated, the addition of emulsifier O to Carbopol 934P makes possible the raising of the total menstruum to pH 7.0 or above without gelation which facilitates injection.

Since remaining unreacted free hydroxyl or carboxyl groups of the Carbopol 934P molecules may bind to the host's tissues at the injection site and could cause irritation or induration, it is desirable to minimize this possibility. These carboxyl-hydroxyl groups can be neutralized by chemical bonding with amine groups of various chemical compounds such as: (1) collagen (preferably reconstituted), (2) basic amino acids, (3) epinephrine or other catecholamines, (4) peptides, (5) synthetic amines or polyamines, (6) antigens such as those consisting of proteins or mucopolysaccharides, (7) natural non-antigenic proteins such as actomysin or agar agar, or (8) peptide (amino-group-containing) antibiotics.

When the bond sites of Carbopol 934P are not fully occupied by antigens, then in order to protect the host's tissues from irritation, sufficient amine-containing substances should be added to neutralize most of the free hydroxyl or carboxyl groups. The selected compound or material depends upon the nature of the final product. For example, reconstituted collagen is ideally suited in many cases where the injection is to be made subcutaneously since it is a natural non-antigenic substance at this subcutaneous site and therefore tends to bond to the natural collagen, thus adding to the adjuvant effect by mechanically interfering with the dispersion of the antigen. Purified or reconstituted collagen is an essentially nonallergenic protein since it does not contain significant amounts of tryptophane nor tyrosine; hence , it does not cause tissue reactions. Furthermore, reconstituted collagen does not stimulate a significant secondary antigenic response which would compete with that of the antigen.

A preferred procedure for producing reconstituted collagen for use in adjuvant "HL" is detailed in the process flow sheet set forth in the drawing hereof. Other procedures are outlined in an application for U.S. Letters Patent, assigned to the same assignee, bearing Ser. No. 539,310, filed Apr. 1, 1966, and entitled "Injectable Adjuvant, Method of Preparing Same and Compositions Including Such Adjuvant."

Specific examples of antigenic compositions containing adjuvant "HL" are set forth hereunder along with tests supporting the potentiated results obtained from the use of the adjuvant.

EXAMPLE NO. 1

Clostridium chauvoei septicum bacterin (1) Preparation of bacteria.—Several known antigenic strains of the species above were grown and inactivated according to conventional standard procedures.

(2) Preparation of experimental bacterins.—Six experimental bacterins were prepared as follows from a production batch:

| Lot No. | Sub-lot | Description |
|---|---|---|
| 3 | A | 200 ml. of inactivated bacterial suspension was allowed to settle. 20 ml. of supernate was siphoned off and replaced with 20 ml. of adjuvant "HL". |
| 3 | B | 200 ml. of formalin-inactivated bacterial suspension was centrifuged at 2,500 r.p.m. The supernate was discarded. To the packed cells adjuvant "HL" was added to restore the product to its original volume (200 ml.). |
| 3 | C | 200 ml. of inactivated product was allowed to settle. 100 ml. was siphoned off. The 100 ml. of supernate was used as fluid base for Carbopol 934P constituent in the adjuvant "HL." The 100 ml. of completed adjuvant containing the supernate was added to the product, restoring to original volume. |
| 3 | D | 200 ml. of inactivated product was allowed to settle, and 20 ml. of supernate was siphoned off. To 180 ml. of product, 20 ml. of 1% alum phosphate was added to bring the final volume to 200 ml. |
| 3 | E | 200 ml. of product without any adjuvant or concentration. |
| 3 | F | 200 ml. of product concentrated to 100 ml. with alum. |

(3) Conduct of experiment.—350 to 450-gram guinea pigs were used in the test, divided into 16 groups of 5 guinea pigs each. Two of the groups of 5 guinea pigs each were set aside as controls. Each sub-lot was broken down into two groups of 5 guinea pigs each. Each group of guinea pigs (except controls) was then inoculated subcutaneously with 0.25 cc., and 0.5 cc., (each sub-lot contained one group which received 0.25 cc. and one group that received 0.5 cc.) bacterin. Seven days later, all principals received a booster inoculation. Fourteen days later all principals and controls received a 10 $LD_{80}$ dose of standard Clostridium chauvoei F spore.

(4) Results:

| | | A/P [1] | | Percent survival | |
|---|---|---|---|---|---|
| Lot No. | Sublot | 0.25 cc. | 0.5 cc. | 0.25 cc. | 0.5 cc. |
| 3 | A | 2/5 | 2/4 | 40 | 50 |
| 3 | B [2] | 4/5 | 5/5 | 80 | 100 |
| 3 | C [2] | 4/5 | 5/5 | 80 | 100 |
| 3 | D | 2/5 | 2/5 | 40 | 40 |
| 3 | E | 2/5 | 3/5 | 40 | 60 |
| 3 | F [2] | 3/5 | 5/5 | 60 | 100 |
| Controls | Challenge material | 1:50,000 | →0/5 | 0 | |
| Do | do | 1:500,000 | →1/5 | 20 | |

[1] Alive over principals challenged.
[2] Sub-lots B and C were made from unconcentrated material, and sub-lot F was concentrated 50% with alum.

EXAMPLE NO. 2

Clostridium perfringens type C toxoid (1) Preparation of toxoid.—Clostridium perfringens type C was grown and inactivated according to conventional production procedures. The cells were removed by centrifugation and the supernate was filtered through a sterilizing bacteriological filter.

(2) Preparation of experimental toxoid.—15 litters of toxoid was divided into five 3-liter batches and treated in the following manner:

| Lot No. | Sub-lot | Description |
|---|---|---|
| 2 | A | 3 liters of "C" toxoid containing 10% adjuvant "HL." |
| 2 | B | 3 liters of "C" toxoid containing 50% adjuvant "HL" (1,500 ml. toxoid plus 1,500 ml. adjuvant "HL." |
| 2 | C | 3 liters of "C" toxoid containing 10% $Al(OH)_3$. |
| 2 | D | 3 liters of "C" toxoid, no adjuvant was added. |
| 2 | E | 3 liters of "C" toxoid bacterin (containing cells) was concentrated to 1,500 ml. with $Al(OH)_3$ |

(3) Conduct of experiment.—Twenty-five adult, 4-lb. rabbits were used in the test, divided into five groups of 5 rabbits each. Each group of rabbits was then inoculated subcutaneously with 2 cc. of one of the five sub-lots. Fourteen days later each rabbit received a 2 cc. booster vaccination. Fourteen days after the secondary inoculation, all the rabbits were bled by heart puncture and the serum from each sub-lot was pooled. A toxin-antitoxin assay to determine units of titer present in the hyperimmunized serum was conducted in 18 to 20-gram white mice.

(4) Results:

| Lot No. | Sub-lot | 20 A.U.[1] | 30 A.U. | 40 A.U. | 50 A.U. | 60 A.U. | Units obtained, A.U. |
|---|---|---|---|---|---|---|---|
| 2 | A | [2] 5/5 | 5/5 | 5/5 | 5/5 | 0/5 | 50 |
| 2 | B | 5/5 | 5/5 | 5/5 | 4/5 | 0/5 | 40 |
| 2 | C | 5/5 | 5/5 | 5/5 | 3/5 | 0/5 | 40 |
| 2 | D | 4/5 | 3/5 | 0/5 | 0/5 | 0/5 | 20 |
| 2 | E | 5/5 | 5/5 | 5/5 | 5/5 | 0/5 | 50 |
| Controls | | 10L+ | | | | | 1/5 |
| Controls | | 10Lo | | | | | 5/5 |

[1] International Antitoxin Units.
[2] Alive over principals.

EXAMPLE NO. 3

Leptospira icterohemorrhagiae canicola bacterin (1) Preparation of bacteria.—The two species of Leptospira were grown separately and inactivated according to conventional production procedures. The bacterial suspensions were concentrated and the supernate discarded. Concentrated cells were reconstituted with 0.85% saline.

(2) Preparation of experimental bacterin.—Antigen was obtained from a single production lot and divided into equal volumes.

(1)

|  | Percent |
|---|---|
| Leptospira Icterohemorrhagiae Canicola bacterin | 50 |
| Adjuvant "HL" | 50 |

(2)

|  | |
|---|---|
| Leptospira Icterohemmorhagiae Canicola bacterin | 50 |
| Aluminum hydroxide | 10 |
| Saline | 40 |

The test was a comparison of the antibody (agglutinins) response in guinea pigs of these two experimental bacterins. Six guinea pigs were used for each of the preparations. The dose per animal was 1.0 ml. injected subcutaneously. Preinoculation sera were negative. Sera taken three weeks post inoculation were tested by the agglutination-lysis test with the following results:

| Guinea pig No. | Adjuvant | Icterohemorrhagiae | | | | | Canicola | | | | |
|---|---|---|---|---|---|---|---|---|---|---|---|
| | | 1:10 | 1:50 | 1:250 | 1:1,250 | 1:6,250 | 1:10 | 1:50 | 1:250 | 1:1,250 | 1:6,250 |
| 1 | Adjuvant "HL" | 4+ | 3+ | 2+ | | | 4+ | 4+ | 3+ | 2+ | 1+ |
| 2 | do | 4+ | 4+ | 2+ | 2+ | | 4+ | 4+ | 4+ | 3+ | 1+ |
| 3 | do | 3+ | 3+ | 1+ | ± | | 4+ | 4+ | 3+ | 1+ | 1+ |
| 4 | do | 3+ | 2+ | 2+ | 1+ | ± | 4+ | 3+ | 2+ | ± | |
| 5 | do | 4+ | 2+ | 1+ | | | 4+ | 2+ | 2+ | 1+ | |
| 6 | do | 3+ | 3+ | 1+ | 2+ | ± | 4+ | 3+ | 1+ | ± | |
| 7 | $Al(OH)_3$ | 4+ | 2+ | 1+ | | | 3+ | 2+ | ± | | |
| 8 | $Al(OH)_3$ | 2+ | 1+ | ± | | | 4+ | 4+ | 2+ | + | |
| 9 | $Al(OH)_3$ | 3+ | 1+ | ± | | | 4+ | 2+ | + | + | |
| 10 | $Al(OH)_3$ | 3+ | 2+ | 1+ | | | 3+ | 1+ | ± | | |
| 11 | $Al(OH)_3$ | 2+ | 1+ | 1+ | | | 4+ | 1+ | 1+ | | |
| 12 | $Al(OH)_3$ | 4+ | 2+ | ± | | | 4+ | 3+ | 1+ | | |

EXAMPLE NO. 4

Bivalent encephalomyelitis vaccine, TCO (1) Preparation of virus.—Encephalomyelitis virus strains, Massachusetts EEE and Rockefeller WEE.[1] were harvested from tissue culture fluid following conventional standard procedures. The tissue culture fluid was inactivated with formalin and stored at plus 5° C.

(2) Preparation of experimental vaccines.—A single lot of inactivated virus was divided into three equal volumes. Three experimental vaccines were prepared as follows:

| Lot No. | Sub-Lot | Description |
|---|---|---|
| 1 | A | 9 ml. of EEE inactivated tissue culture fluid and 9 ml. of WEE inactivated tissue culture fluid were combined with 2 ml. of twenty percent (20%) of hydrolyzed gelatin. |
| 1 | B | 9 ml. of EEE inactivated tissue culture fluid and 9 ml. of WEE inactivated tissue culture fluid were combined with 2 ml. of ten percent (10%) adjuvant "HL". |
| 1 | C | 10 ml. of EEE inactivated tissue culture fluid and 10 ml. of WEE inactivated tissue culture fluid were combined without an adjuvant. |

(3) Conduct of experiment.—Twenty-five 350-to-400 gram guinea pigs were used in the test, divided into five groups of 5 each. Two groups were set aside as controls.

Three groups of guinea pigs were inoculated subcutaneously with two 0.5 ml. of one of the three experimental vaccines one week apart and challenged ten days after the second vaccination with 0.1 ml. I.C. (Intracranially) of heterologus virus material diluted $10^{-5}$.

(4) Results.—The challenge virus titration of EEE strain was between 1 and 10 guinea pigs $LD_{50}$.

| EEE fraction only [1] | Alive over principals | Percent survival |
|---|---|---|
| Vaccine: | | |
| A (gelatin) | 4/5 | 80 |
| B (10% adjuvant "HL") | 5/5 | 100 |
| C (no adjuvant) | 2/5 | 40 |
| Controls: | | |
| $10^{-5}$ | 0/5 | 0 |
| $10^{-6}$ | 2/5 | 40 |

[1] The Western test was terminated as a "no test" prior to completion due to respiratory or non-specific disease in the test animals.

EXAMPLE NO. 5

Carbopol 934P titration with Epinephrine

Equal amounts of Carbopol 934P and Epinephrine, both at 1:1000 strength were combined and 0.15 cc. doses injected into the ears of rabbits close to the posterior auricular vein. It was found that the Carbopol 934P bound the Epinephrine, but released it after three hours and continued releasing the material for about 24 hours. Measurement was made by counting the branches of the central artery visible when a light was placed behind the ear. In contrast when plain Epinephrine was injected in equal amounts, the effect started immediately and lasted from two to three hours. These tests at least partly verify the fact that amino compounds such as Epinephrine bind to Carbopol 934P and are then released slowly in a physiological environment of approximately pH 7.4.

[1] Massachusetts eastern equine encephalomyelitis and Rockefeller western equine encephalomyelitis.

Similar tests were conducted on erysipelas bacterin with equivalent results being obtained.

Although not described in detail above, it is to be understood that in preparation of an injectable medicinal composition in accordance with this invention, the pH of the solution is brought to substantailly 7.0 by addition of sodium hydroxide thereto since the complexing resin gives a pH of about 4 and the emulsifier a pH of about 3.8.

Having thus described the invention, what is claimed as new and desired to be secured by Letters Patent is:

1. An injectable medicinal composition comprising an adjuvant and a medicinal antigen agent having N atoms, said adjuvant including in parts by weight, 1 part of an emulsifier made up of 2.5 parts of polyoxyethylene sorbitan monooleate, 2.5 parts of sorbitan monolaurate, 50 parts of cottonseed oil and 100 parts of q.s. of water, combined with 0.1 to 0.3 part of a polymer of acrylic acid cross-linked with polyallyl sucrose, and 25 to 50 parts of reconstituted collagen, there being from 1 part to 50 parts by volume of said adjuvant for each 1 part by volume of said medicinal antigen agent.

2. An injectable medicinal composition as set forth in claim 1, wherein is provided 0.2 part of said acrylic acid polymer and 20 parts of reconstituted collagen.

References Cited

UNITED STATES PATENTS

| | | | |
|---|---|---|---|
| 3,178,350 | 4/1965 | Lund | 424—89 |
| 3,469,003 | 9/1969 | Hardy | 424—89 |

SHEP K. ROSE, Primary Examiner

U.S. Cl. X.R.

424—85, 89, 91, 92, 177, 309, 325, 330